INVENTOR.
Harvey A. Klumb

INVENTOR.
Harvey A. Klumb

Aug. 20, 1968     H. A. KLUMB     3,397,578
MOTION AMPLIFYING MECHANISM FOR PRESSURE
RESPONSIVE INSTRUMENT MOVEMENT
Original Filed April 3, 1963     3 Sheets-Sheet 3

INVENTOR.
Harvey A. Klumb

United States Patent Office 3,397,578
Patented Aug. 20, 1968

3,397,578
MOTION AMPLIFYING MECHANISM FOR PRESSURE RESPONSIVE INSTRUMENT MOVEMENT
Harvey A. Klumb, Pittsford, N.Y., assignor to Taylor Instrument Companies, Rochester, N.Y., a corporation of New York
Original application Apr. 3, 1963, Ser. No. 270,311, now Patent No. 3,232,183, dated Feb. 1, 1966. Divided and this application Sept. 27, 1965, Ser. No. 508,180
4 Claims. (Cl. 73—386)

This invention relates generally to pressure-responsive instrument movements and the like such as find use in indicating, recording, controlling and/or signalling apparatus, and particularly in barometers and altimeters for use in such apparatus. The present application is a division of my copending application Ser. No. 270,311, filed Apr. 3, 1963, and now Patent No. 3,323,183, granted Feb. 1, 1966.

The main object of the present invention is to provide a novel improved form of motion amplifying mechanism for instrument movements. Other, more specific objects of my invention will appear in the detailed description to follow, hereinbelow.

Figure 1:
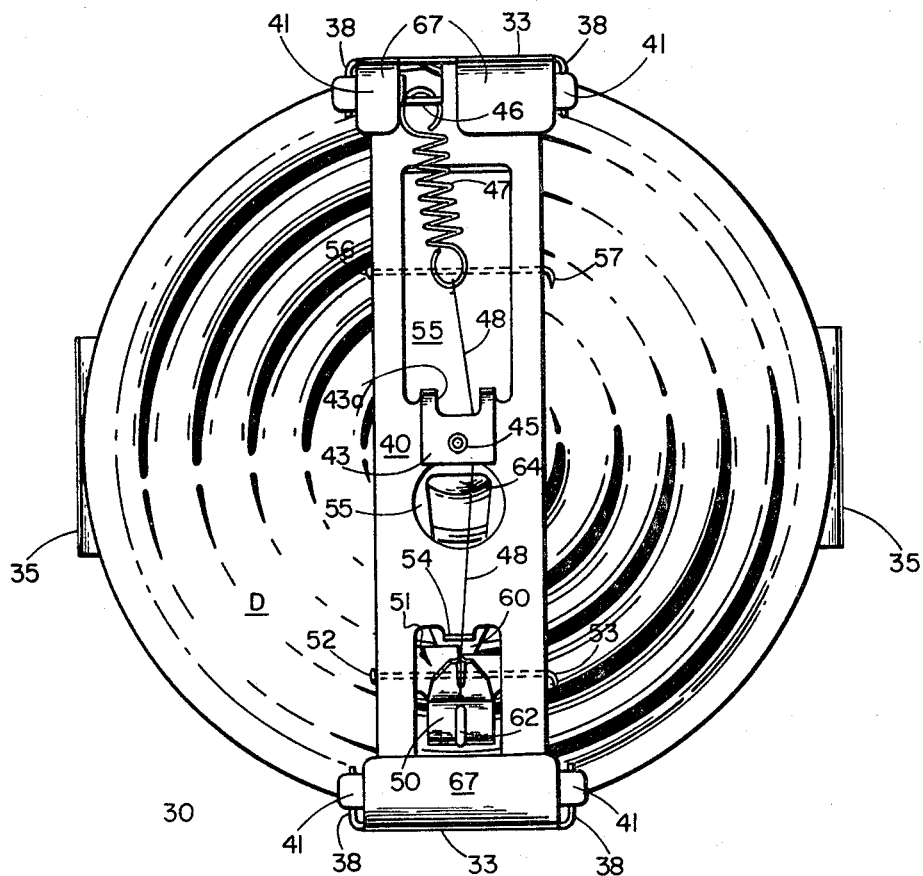
FIGURES 1, 2 and 6 are respectively a plan view and two elevations of an instrument movement according to the invention.
Figure 2:
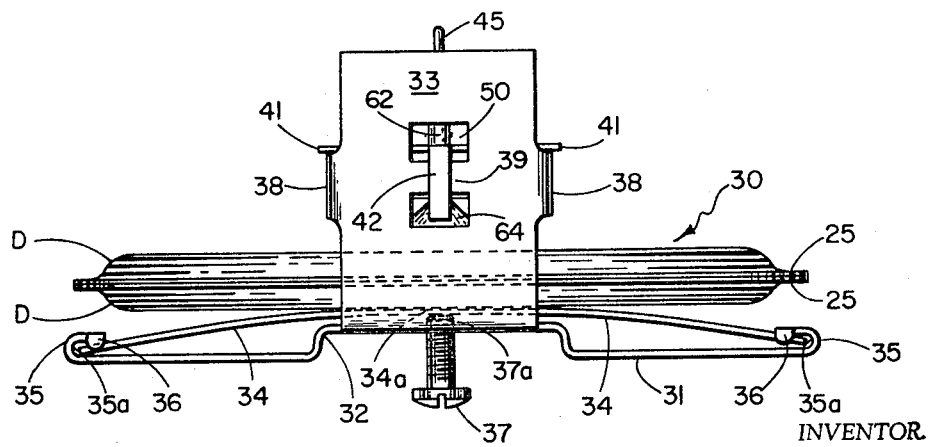
Figure 6:
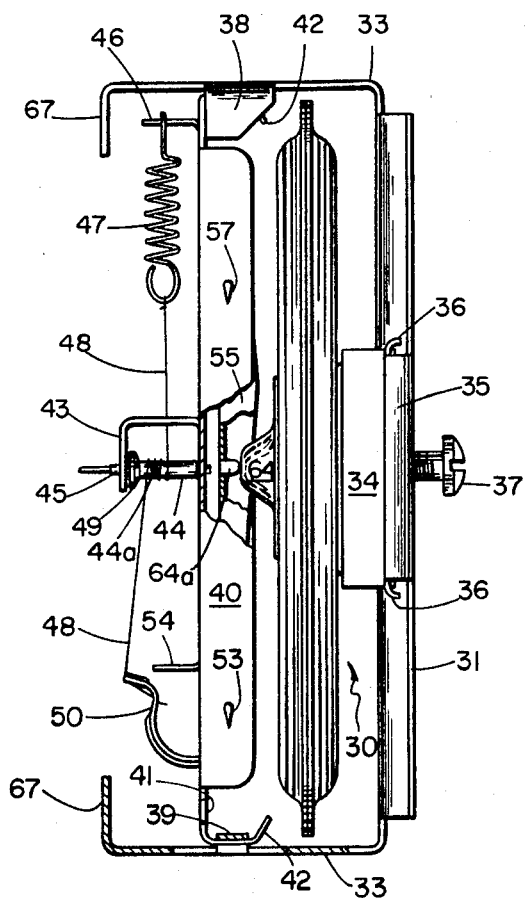

FIGURES 1, 2 and 6 illustrate the invention in a movement of the aneroid barometer type including a capsule 30, which may be such as claimed and disclosed in my aforesaid copending application. Capsule 30, composed of two diaphragms D, welded together concave side to concave side by their flanges 25, is mounted on a generally circular support plate 31, provided with a diametral stiffening channel 32, the web of which terminates at each end in a wing 33 projecting from the edge of the plate 31 and perpendicular thereto. A generally rectangular spring leaf 34, of about the diameter of plate 31, and flat when in unstressed position, is sprung between a pair of wings 35 projecting from the ends of a diameter of plate 31 but bent over to form a pair of troughs 35a opening toward each other. Each of wings 35 is provided with tabs 36 bent down over the ends of the said troughs toward plate 31 but preferably not so close thereto that ends of spring leaf 34 cannot be forced closely enough to plate 31 that they cannot slide out of the said troughs passing under the tabs 36.

The center portion of spring leaf 34 is integrally secured to the bottom diaphragm D of capsule 30 at substantially precisely the boundary of the pad portion thereof corresponding to recess 15a in FIGURE 2 of my aforesaid copending application. Spring leaf 34 (its ends are preferably rounded to permit easy insertion under wings 35) is bowed upwards by channel 32, when leaf 34 is fitted between wings 35, with its ends under the wings 35. Since the tabs 36 prevent said ends from sliding out from under wings 35, said spring leaf is held securely in the position shown by reason of its springy nature.

A set screw 37, threaded into a central aperture (not shown) in plate 31 is provided that can be screwed along the axis of symmetry of capsule 30 (which axis coincides with center line of plate 31) to force the central portion of spring leaf 34 further away from plate 31, thus elevating the capsule 30 above the plate. Wings 35 extend inwardly far enough that an end of said spring leaf cannot slip out of troughs 35a as the leaf is forced upwards. The end 37a (shown in dashed line in FIGURE 2) of screw 37 abuts against the under side of the intermediate portion 34a (shown in dashed line in FIGURE 2) of spring leaf 34 facing plate 31. Intermediate portion 34a is rigidly fixed to the central portion of the lower diaphragm D to define a circular, rigid center pad corresponding to pad 15, FIGURE 1 of my aforesaid copending application.

The center pad portion of the diaphragm D next the plate 31 is therefore held firmly at a fixed distance from the plate, since it is rigidly prevented from moving in one direction by screw 37, and, in the other direction by the relatively-stiff elastic force opposing further bowing of spring leaf 34.

The motion amplifying mechanism of the movement is supported by and between wings 33, these latter each being provided with arms 38 projecting inwardly of and in generally parallel to plate 31, and each thereof having a hasp 39 projecting out of the general plane thereof toward the center line of plate 31. Only the one hasp 39 is shown, the other thereof being located between ears 38 at the right-hand side of FIGURE 6.

A generally channel-shaped bridge 40 rests on the support provided by hasps 39 and arms 38, a pair of ears 41 projecting from the web of the bridge 40 at each end thereof over and resting on a pair of arms 38, and a tongue 42, projecting from each end of bridge 40, being hooked through a hasp 39. Bridge 40 and wings 33 should be made to interfit tightly without play, as by bending up the extremities of the tongues 42 around the hasps and flattening the hasps slightly, and/or spreading wings 33 so that tongues and hasps tightly engage each other.

A stirrup 43 projects up out of the web of bridge 40 and over the central portion thereof so that the center line of plate 30 passes through the horizontal extremity of stirrup 43. Between this extremity and the web of bridge 40 is a cylindrical arbor 44 having a reduced cylindrical portion 45 received in a circular aperture in said extremity of said stirrup and extending far enough therefrom to provide for mounting a pointer thereon. The other end of arbor 44 terminates in a reduced cylindrical portion (not shown) received in a circular aperture (not shown) in the web of bridge 40, the cylindrical axis of said arbor, of its reduced portion, and the centers of said apertures coinciding with the center line of plate 31, conveniently.

Figure 4:
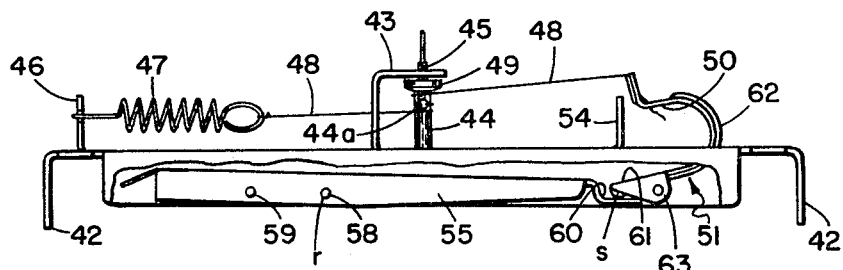
Figure 5:
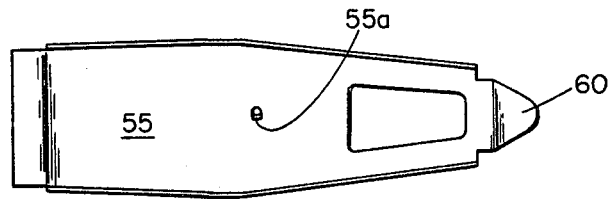
FIGURE 5 is a plan view of a lever used in the structure shown in FIGURES 1, 2, 3, 4 and 6.

A post 46 projects upwardly from the surface of bridge 40 at one end thereof, and on this post is hooked one end of a light extension spring 47, and to the other end of spring 47 is tied one end of a flexible inextensible cord 48, said cord being coiled several times about arbor 44 (which has fixed thereon a beveled disk 49 which prevents cord 48 from climbing up off the body of arbor 44) and having its other end fastened to one end of one arm 50 of a crank 51 (see FIGURE 4). Cord 48 passes through a cutout 43a in the vertical portion of stirrup 43, and a hole 44a is provided in arbor 44 in order to assure a non-slipping connection between arbor 44 and cord 48. Crank 51 is journaled on a straight pin which, as indicated by the dashed line showing of the body thereof, passes through the sides of bridge 40, and whose head 52 and bent point 53 prevent it from slipping out of the sides of bridge 40. If crank 51 is deflected so as to uncoil some of its portion of cord 48 from arbor 44, said arbor rotates, wraps up some cord from the portion thereof tied to spring 47 and extends spring 47. If the deflecting force is removed from crank 51, the spring 47 will pull the crank back to the position from which it was first deflected. Spring 47 is therefore a return spring that takes up play in the motion amplifying mechanism and unwraps its portion of cord 48 from arbor 44 to the extent permitted by the motion amplifying mechanism and the forces, if any, acting in opposition to the spring's tendency to assume its free length or contracted state. A post 54, upstanding from bridge 40, is positioned in the path of and closely enough to arm 50 to prevent complete return of the spring 47 to its free length.

Figure 3:
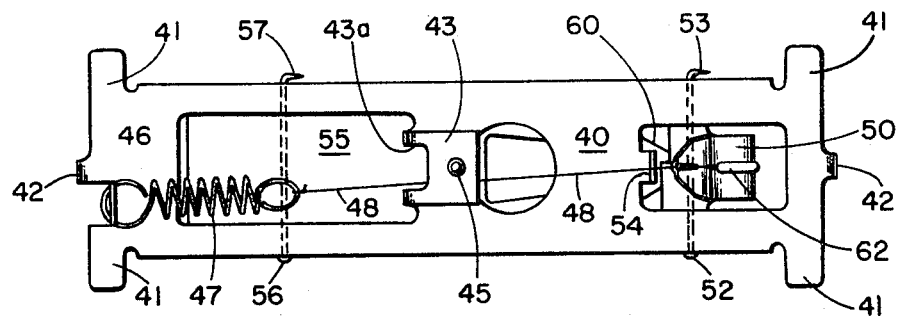
FIGURES 3 and 4 are, respectively, a plan view and an elevation of a portion of the movement shown in FIGURES 1, 2 and 6.

It will be observed, in FIGURE 1, that the two halves of cord 48 come off arbor 44 at an angle substantially less than a straight angle. This arrangement is adopted in the case where the movement is used in an altimeter. In FIGURE 3, which shows end portions of bridge 40 from the top more fully, the major portions of the cord 48 make a straight angle, which is a result of simply interchanging the ends of the cord from the state of FIGURE 1.

If the cord 48 coincided with a line tangent to the arbor, i.e., went on and came off the arbor at exactly the same point, pivot friction would be substantially nil, insofar as the tension in cord 48 is concerned. Actually, this tension creates a slight couple on the arbor in any case, since, as evident from FIGURES 6 and 4, the cord 48 comes off and goes on the arbor at points spaced along the length of the arbor.

A channel-like beam 55, which more or less nests (see FIGURE 6) in the channel-like bridge 40, is provided to transfer capsule motion to crank 51, and is pivoted by a second straight pin, whose head 56, and bent point 57, are visible in FIGURE 3. As indicated by the dashed line showing of the body of the said second straight pin, it runs through the downwardly projecting sides of bridge 40 and beam 55, suitable holes such as shown at 58 and 59 on beam 55 in FIGURE 4, being provided to journal the said pin in. Each of said holes has a counterpart in the other side of the view, making four in all, thus providing a choice of leverages. As is evident from the dashed line showing of pins, in FIGURE 1, the pair of holes including hole 59 is chosen, whereas in FIGURE 3, the pair of holes including 58 is chosen. The amplification due to lever 55 is therefore greater in the species of FIGURE 3 than in the species of FIGURE 1.

A tongue 60 at the end of beam 55 is overlapped by a second arm 61 of crank 51. As is evident from the figures, arms 50 and 61 of crank 51 are both parts of a curved piece having a rib 62 running along the convex side of said curved piece, said rib serving to stiffen said crank. A tab (visible at s, FIGURE 4) is struck down from the end of arm 61 and being rounded at its end, provides a one-point contact between the flat upper surface of tongue 60 and the extremity of arm 61. Ears 63 are also provided on the crank (only one ear 63 is shown, see FIGURE 4) which provide for journalling the crank on the first-mentioned straight pin.

The top diaphragm D of the capsule has a flat-topped nipple 64 extending from the center thereof, conveniently forming part of a rigid center pad secured to the diaphragm, and homologous with rigid center pad portion 15 of the diaphragm of FIGURE 1 of my aforesaid copending application. The flat top of this nipple 64 is tangent to a rounded teat 64a struck out of the web of beam 55, and when it changes position, either forces beam 55 to deflect upward and cause crank 51 to unwrap some of cord 48 from arbor 44 against the reaction of spring 47, or allows the beam 55 to deflect down, in which case arm 61 follows tongue 60 in contact therewith, since through crank 51 spring 47 is urging arm 61 against tongue 60 at all times.

Obviously, arbor 44 rotates in one sense or the other, on its cylindrical axis, depending on whether capsule 30 is expanding or contracting to move nipple 64 upward or downward, respectively.

Figure 7:
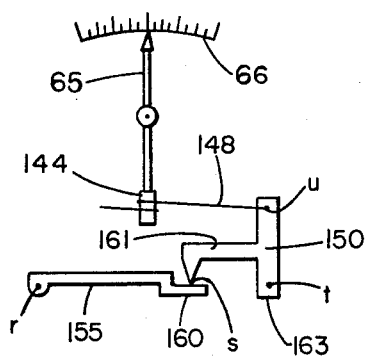
FIGURE 7 is a diagrammatic illustration of the principles of a movement in accordance with the invention.

One virtue of the capsule 30 is, according to my aforesaid copending application, that it simplifies calibration of the instrument movement in which it is used. Additionally, a contribution the amplifying mechanism can make to obviating calibration of the movement is illustrated in FIGURE 7 in somewhat idealized fashion. As suggested by the reference numeral scheme, 155 represents the beam 55; 160, the tongue 60; 161, the arm 61 of crank 51; 150, the arm 50 of crank 51; 148, a portion of cord 48; 144, arbor 44; and 163, ear 63. Also, $r$ represents an end of the pivot axis of beam 55; $s$, the point of tangency of tongue 60 and arm 61; $t$, an end of the pivot axis of crank 51; and $u$, the point of fixation of cord 148 to arm 50 of crank 51. Finally, reference numeral 65 is to be supposed to denote a pointer fixed to arbor 144 and arranged to sweep around an arcuate scale 66 centered on the pivot axis of arbor 144. (Wings 33 (FIGURES 1 and 6) have tabs 67 for mounting a scale plate (not shown) with its plane parallel to plate 30, and having an arcuate, graduated line segment such as scale 66 thereon.)

If a right line segment be drawn through points $r$ and $t$ in FIGURE 7, it will be found to contain point $s$. If a normal to said segment be erected on point $t$, said normal will be found to contain point $u$. These points therefore define the lengths and orientations of the effective lever arms of beam 155, arm 161 and arm 150. In the state described, the linkage thus represented is said to be squared, and at the same time it will be noted that pointer 65 bisects scale 66. If this arrangement of parts is provided for in the manufacture of the motion amplifying mechanism, of the movement, capsule 30 need merely be inserted in the movement and bodily adjusted toward bridge 40 until pointer 65 coincides with that indicium on scale 66 which corresponds to the correct reading at that altitude. In the case of a barometer, the said indicium will be that of the true barometric pressure at the capsule, and in the case of an altimeter, the true altitude of the movement. (This altimeter setting can only be correct, however, as long as the actual barometric pressure at the time of setting does not change. This is an idiosyncracy affecting all schemes for using barometric pressure as a measure of altitude.)

The illustrated motion amplifying mechanism is both economical of parts and labor, efficient and precise. The only machined parts are arbor 44 and screw 37, the remainder being stamped from a suitable material such as brass sheet, except cord 48, straight pins mounting crank 51 and beam 55 and spring leaf 34. The said "straight pins" are just those of household use that are called by that name. Spring leaf 34, of course, is made of brass, or other suitable spring material. Cord 48 is a silk or nylon thread, or the like. All parts of the movement are held in place without welding or soldering. A small blob of cement is placed on each of bent points 53 and 57, to assure that they do not move. Cord 48 passes through a slot 68 in the end of arm 50, and is cemented in place there. Only nipple 64, spring leaf 34 and the diaphragms D form an integral subassembly held together by welding and/or soldering.

Moreover, it will be observed that the movement is composed of exactly 14 separate parts: two diaphragms D, a center pad including nipple 64, screw 37, plate 31, spring leaf 34, bridge 40, arbor 44, cord 48, spring 47, beam 55, crank 51 and two straight pins. As disclosed in my aforesaid copending application, prior art movements require twice this number of parts and more.

As a barometer, the parts of the movement can be so proportioned that the capsule 30 drives the arbor 44 through nearly a 360° angular deflection for 2.4″ Hg change in barometric pressure. For altimeter use, say in the range of 0 to 6,000 ft., the diameter of arbor 44 is decreased enough that the movement as shown in FIGURES 1, 2 and 6, rotates the arbor 720° for the pressure change corresponding to 0 to 6,000 ft. For an even larger range, say 0 to 14,000 ft., the same movement is used except for a modification that amounts to fixing beam 55 rigidly to nipple 64 and omitting the pin corresponding to head 56. In practice, a rigid bar is fixed to nipple 64, said bar extending under and contacting the tab at s, as does tongue 60 in FIGURE 4.

The type of aneroid instrument movement described above does not, unlike its usual prior art counterpart, involve a relatively stiff main spring for controlling the expansions and contractions of the capsule. However, the motion amplifying mechanism of the described movements does not depend on the presence or absence of such main spring, and, in general, is useful as a means for amplifying the motions of any sort of pressure responsive device, or like condition responsive element having a relatively small motion which must be amplified efficiently and accurately. Hence, the claims appended hereto are not to be deemed to be limited to use of a capsule or diaphragm according to the invention disclosed and claimed in my aforesaid copending application.

In the foregoing, I have described my invention in such detail as to enable one skilled in the art to practice my invention to best advantage, insofar as that is to me known thus far. However, it is obvious that there are many variations in structure and application of the invention that may be carried out by one skilled in the art without exercise of invention. Hence, the invention, as described herein, is to be considered illustrative only of the claims appended hereto.

I claim:

1. In a pressure responsive instrument having a pressure responsive chamber including a wall portion movable in response to change in fluid pressure thereon, the improvement comprising a plate means and a leaf spring; wing means on said plate means, said wing means being spaced apart in order to accommodate the length of said leaf spring; said leaf spring being held between said wing means with its said length running between said wing means; one end of said leaf spring being held in substantially fixed position between said plate means and one of said wing means, and the other end thereof being held in substantially fixed position between said plate means and the other of said wing means; said pressure responsive chamber being mounted on the intermediate portion of said leaf spring substantially equidistant from each said end, and adjustable means movable in such direction into engagement with said leaf spring at said portion as to force the said intermediate portion of said leaf spring away from the plate means; said wing means being in the form of a pair of troughed members each having a trough positioned to receive the ends of said spring leaf, one side of each said trough overlying a said end and the next adjacent surface portion of said plate means.

2. In combination, a base plate having a pair of arms standing up therefrom at opposite edges of said plate, an aneroid capsule mounted between said arms and on said base plate, a bridge extending between said arms, a lever extending between said arms and pivoted to said bridge for deflection of the ends of said lever toward and away from said plate, and said capsule having a portion movable toward and away from said plate as ambient pressure increases and decreases, respectively;

a crank pivoted to said bridge at one end thereof for deflection relative to the length of said bridge between said arms, said crank having one arm extending between said bridge and said capsule and being positioned to be deflected by said lever upon pivoting of the latter, said crank having a second arm extending above said bridge on the other side thereof from said one arm thereof;

an arbor pivoted to said bridge for rotation, an inextensible filament and a return spring, said spring being connected to one end of said filament, and the other end of said filament being connected to said second arm, said filament lying along and above said bridge and having its intermediate portion wrapped on said arbor and said spring tensioning said filament such as to deflect the said one arm of said crank into contact with said lever; said portion of said capsule being adapted to move away from said plate and against said lever at a point spaced both from the pivot axis of said lever and the place of contact of said crank thereon, the arrangement being that said portion, upon decrease of ambient pressure, pivots said lever so as to change the stress in said spring whereby said arbor rotates to angular positions corresponding to ambient pressure; said capsule being provided with spring means biasing it toward said base plate, rigid abutment means on said base plate and between the same and said capsule for maintaining said capsule spaced from said base plate despite the bias of said spring, and said rigid means being adjustable to establish different fixed spacings between base plate and capsule.

3. The invention of claim 2, wherein said spring means is a spring leaf, and means is provided to maintain opposite ends of said spring leaf adjacent said plate, while permitting said ends to move if the intermediate portion of said spring leaf is forced away from said plate, said capsule is mounted on said intermediate portion, and adjustment is provided for forcing said intermediate portion to various positions in which said spring leaf is bowed away from said plate.

4. A pressure responsive instrument having an aneroid capsule, motion amplifying mechanism, an indicator and supporting structure mounting said capsule, said mechanism and said indicator;

said mechanism including a lever pivoted for deflection about a first axis, a crank pivoted for deflection about a second axis, said first axis and said second axis being in the same plane, and said crank having a first arm and a second arm, the effective lever arms of said arms of said crank being displaced 90°, one from the other, with respect to deflection about said second axis; the deflection plane of said effective lever arms intersecting the deflection plane of said lever, and the effective lever arm of said lever and the effective lever arm of said first arm being crossed over and tangent to each other; an arbor arranged to pivot in place, and means interconnecting the effective lever arm of said second arm and said arbor for pivoting said arbor in one sense when said crank is deflected by pivoting of said lever so as to make the latter press against said first arm; spring means providing elastic bias against pivoting of said arbor in said one sense; said arbor, crank and lever being mounted on said supporting structure;

said capsule having a center pad and being mounted on said supporting structure for adjustment along a given path; said given path lying substantially in the plane of deflection of said lever, and said adjustment being toward and away from said lever;

said capsule being responsive to ambient pressure to move said center pad along said path to positions therealong corresponding to said ambient pressure;

said spring means exerting elastic bias on said mechanism, such as to deflect said lever into engagement with said center pad, when said center pad is within a predetermined distance along said path from said lever;

said indicator including a pointer mounted on said arbor for rotation thereby and a plate having a scale thereon swept over by an extremity of said pointer, said plate being so oriented with respect to said support structure that the midpoint of said scale is pointed to by said extremity when the place of tangency of the effective lever arms of said lever and said first arm is in said first plane.

References Cited

UNITED STATES PATENTS 459,977  9/1819  Moller _____ 73—386

DAVID SCHONBERG, *Primary Examiner.*

DONALD O. WOODIEL, *Assistant Examiner.*